(12) United States Patent
Buchwald et al.

(10) Patent No.: US 8,375,657 B2
(45) Date of Patent: Feb. 19, 2013

(54) INSULATING GLAZING UNIT COMPRISING A CURVED PANE

(75) Inventors: Detlef Buchwald, Berlin Allemagne (DE); Oliver Kroessel, Berlin Allemagne (DE); Helmut Maueser, Herzogenrath Allemagne (DE); Stefan Immerschitt, Hennef Allemagne (DE); Hubert Hauser, Wuerselen Allemagne (DE)

(73) Assignee: Saint-Gobain Glass France, Courbevoie (FR)

( * ) Notice: Subject to any disclaimer, the term of this patent is extended or adjusted under 35 U.S.C. 154(b) by 313 days.

(21) Appl. No.: 12/524,752

(22) PCT Filed: Jan. 29, 2008

(86) PCT No.: PCT/FR2008/050131
§ 371 (c)(1),
(2), (4) Date: Jul. 28, 2009

(87) PCT Pub. No.: WO2008/107612
PCT Pub. Date: Sep. 12, 2008

(65) Prior Publication Data
US 2010/0031590 A1    Feb. 11, 2010

(30) Foreign Application Priority Data
Feb. 6, 2007   (DE) .................. 10 2007 005 757

(51) Int. Cl.
*E06B 7/00* (2006.01)
(52) U.S. Cl. ............... 52/204.593; 52/204.62; 428/34

(58) Field of Classification Search ............ 52/204.62, 52/204.593; 428/34
See application file for complete search history.

(56) References Cited

U.S. PATENT DOCUMENTS

| | | | | |
|---|---|---|---|---|
| 2,273,733 A | * | 2/1942 | Paddock | 428/34 |
| 2,316,993 A | | 4/1943 | Sherwood | |
| 4,467,586 A | * | 8/1984 | Long et al. | 52/748.1 |
| 4,835,130 A | * | 5/1989 | Box | 502/62 |
| 5,995,272 A | | 11/1999 | Paetz | |
| 6,033,150 A | * | 3/2000 | Culen | 405/216 |
| 6,158,483 A | * | 12/2000 | Trpkovski | 141/63 |
| 6,228,290 B1 | * | 5/2001 | Reames et al. | 264/1.7 |
| 6,457,294 B1 | * | 10/2002 | Virnelson et al. | 52/786.13 |
| 6,493,128 B1 | * | 12/2002 | Agrawal et al. | 359/265 |
| 2008/0127880 A1 | * | 6/2008 | Dhellemmes et al. | 114/74 A |
| 2011/0019135 A1 | * | 1/2011 | Koganezawa | 349/112 |

FOREIGN PATENT DOCUMENTS

| | | |
|---|---|---|
| DE | 30 02 904 | 8/1980 |
| DE | 38 18631 | 12/1989 |
| DE | 91 16 206 | 4/1992 |
| DE | 197 23 596 | 10/1998 |

(Continued)

*Primary Examiner* — Jeanette E Chapman
*Assistant Examiner* — Daniel Kenny
(74) *Attorney, Agent, or Firm* — Oblon, Spivak, McClelland, Maier & Neustadt, L.L.P.

(57) ABSTRACT

In an insulating glazing unit including at least one curved rigid pane, another rigid pane and a spacer frame joining the two panes together by an impermeable adhesive, a space is created between the panes. The spacer frame has a variable cross-section over its length, looking in the direction of its longitudinal extension, in the region of the joining between the curved rigid pane and the other rigid pane. The spacer frame, in at least in the aforementioned region, includes a plastically deformed elastomer material when the two rigid panes are mutually pressed together.

13 Claims, 3 Drawing Sheets

FOREIGN PATENT DOCUMENTS

| | | |
|---|---|---|
| DE | 100 24 525 | 11/2001 |
| DE | 203 04 806 | 8/2003 |
| EP | 0 805 254 | 11/1997 |
| EP | 0 921 260 | 6/1999 |
| EP | 0921260 * | 9/1999 |
| EP | 1 195 497 | 4/2002 |
| EP | 1 657 396 | 5/2006 |

* cited by examiner

INSULATING GLAZING UNIT COMPRISING A CURVED PANE

The invention relates to an insulating glazing unit comprising a curved pane.

The term "insulating glazing unit" should be understood within the context of the present invention to mean a flat unit formed by at least two rigid panes and a spacer frame joining these two panes together. The spacer frame is assembled on the inner faces of the panes by means of thin adhesive layers. The two main faces facing each other of the rigid panes and the spacer frame define a space between the panes which as a general rule is sealed from air and moisture. The term "rigid" refers here to the relative rigidity of the panes made of glass or plastic in comparison with softer materials.

For the objectives of the invention described here, rigid panes made of glass and plastic are considered, these being just as well in monolithic form as in composite form (comprising at least two rigid panes joined together by surface bonding with an adhesive layer or sheet). Furthermore, it is possible to use prestressed glass panes just as well as those that are partially prestressed or not prestressed.

Document EP 0 921 260 B1 discloses such an insulating glazing unit with a flat rigid pane and a curved rigid pane of cylindrical shape. In the region of the relatively high curvature, the spacer frame with a hollow section of this glazing unit is provided with a protruding rib which has to fill the crescent-shaped slot between the straight hollow section and the curved pane. Such a special construction of the spacer frame is relatively complicated and therefore expensive.

Document EP 1 657 396 A2 teaches an insulating glazing unit with a curved pane of cylindrical shape, the spacer frame of which is made up of a solid section segment, for example made of glass, in the aforementioned curvature region.

Hollow-section spacer frames are for most of the time filled with a desiccant which, to a certain extent, extracts any residual moisture from the space between the panes and any moisture subsequently penetrating thereinto. In this way, the internal vapour deposit on the inside of the panes is lastingly prevented, just as long as no external damage occurs (for example fracture of a pane, debonding between the spacer frame and the panes).

Likewise, document DE 203 04 806 U1 discloses among other insulating glazing units with curved rigid panes of cylindrical shape, in which the two panes may have different radii of curvature. However, that document is silent on the subject of the production of the spacer frame in this curvature region.

It is widely known to manufacture spacer frames for insulating glazing units from an extrudable elastomer material, optionally a thermoplastic elastomer. This has in particular the objective of minimizing heat transfer by thermal conduction in the edge region of the insulating glazing units ("warm-edge" insulating glazing). However, these elastomeric spacer frames impose yet other requirements in order for their impermeability to water vapor diffusion to be able to be compared with values for metal spacer frames. The elastomer material alone is insufficient. Consequently, most elastomer spacer frames also include additional metal inserts or are metallized on the outside or provided with a thin film. It is also known to mix these materials with moisture-drying agents in the space between the panes.

Document EP 0 875 654 A1 discloses a hollow-section spacer frame made of an elastomer material, the mechanical strength of which is increased by the incorporation of glass fibers.

Document EP 1 195 497 A2 discloses the manufacture of an insulating glazing unit with an elastomer spacer frame that can also be plastically deformed after its deposition (extrusion) on one of the rigid panes. In order for the air displaced during the placing of the second pane by the compression of the spacer frame to be able to escape, without it being necessary firstly to provide an opening in the spacer frame, the spacer frame is firstly, according to this disclosure, compressed on one side more strongly than is actually necessary, until the pane has been placed on the opposite side. The pane is then placed on this opposite side of the spacer frame, which is compressed to its set thickness. In this case, and just before closing off the last slot, the air still trapped is displaced several times. In a final step, the side of the spacer frame initially compressed more strongly is relaxed to its "set thickness". However, that document does not relate to the manufacture of curved panes in such an insulating glazing unit.

Also known, from document 30 02 904 A1 and from the trade mark "Swiggle Strip", is an elastomer material with a flexible metal insert, for example for spacer frames of insulating glazing units. This material is also suitable, according to the information provided by the Internet site http://www-.bentglassdesign.com/glasstypes.html (status in January 2007), for joining together two rigid panes curved in the same direction of an insulating glazing unit. In the curved glazed unit shown here, the distance between the panes is the same everywhere, even in the curved regions.

The problem at the basis of the invention is how to provide another insulating glazing unit comprising at least one curved pane and a spacer frame, which has a variable cross-section, considered along its longitudinal extension, in the curvature region of the pane.

This problem is solved according to the invention. The features of the secondary claims present advantageous embodiments of this invention.

Starting from known insulating glazing units comprising curved rigid panes, the curvature of the spacer frame is obtained according to the invention by the plastic deformation of the spacer frame material imposed when pressing the curved pane. This is noticed on the finished product because the spacer frame has local overthicknesses due to the displaced material, which are of course thicker in the region of the largest deformation than in the region of the largest arc height. Outside the space between the panes, the overthicknesses may optionally be removed/eliminated. Independently of this, they may be masked in a known manner by the positioning of an external or secondary (polysulfide finishing) sealant.

The material described in document DE 30 02 904 A1 is very suitable for this application according to the invention, optionally after certain modifications that will be described further below. Of course, other similar materials may also be employed for compensating for the differences in curvature, provided that they have the necessary plastic deformability. There is absolutely no mention in said document of a thermoplastic material which must firstly be heated for the deformation or which can be deformed only in the still-hot state after the positioning operation. Materials able to be durably deformed plastically at ambient temperature are also in principle suitable, provided that they have the necessary strength values for the insulating composite and sufficient adhesion to the faces of the rigid panes.

Even though the preferred application is the combination of a curved pane with a flat pane, two panes of different curvature may however also, according to the invention, be joined together using the compensation capability of the elastomer spacer frame in the region of different curvatures.

Of course, the invention may be applied not only with curved panes of cylindrical shape, but also with curved panes in the space right up to their edges, in which there are therefore more than two curved lateral edges to be joined to the spacer frame. In this case, the deformability of the spacer frame material at each curved edge is used, in which it is necessary to compensate for the different bends and different curvatures between the pairs of panes.

When implementing the present invention, it may be worthwhile to use different base heights for the spacer frame on the uncurved edges and on the edges in the curvature region, that is to say to produce the spacer frame for example from a total of four segments (two pairs of different segments). In the curvature region, a wider embodiment with the required compression volume will be used, while in the uncurved region the section may be narrower. This has the advantage that the material does not have to be compressed as much on the longitudinal edges. Thus, greater arc heights can be produced.

However, this embodiment has the drawback that at each corner there is a bonding or junction point, which must also be sealed.

In such an embodiment, it would also be possible to manufacture the spacer frame segments, in which no curvature is necessary, from a conventional material, including the usual metal spacer frames. It would even be conceivable to manufacture the entire spacer frame from conventional metal sections and to provide them only in the curvature region with a layer of plastically deformable material capable of compensating for the curvature. The intention here is not to compensate for small inequalities of a pane (which is of course possible also to a small extent with the normal adhesive materials between the spacer frame and the surface of the panes), but exclusively to compensate for differences in curvature with arc heights of several millimeters.

Furthermore, the invention may be implemented, depending on the height of the curvature, with precurved panes or also with flat panes, the curvature of which is imposed only during the compression of the spacer frame, within the context of their elastic deformability. Such a "cold bend" may be maintained in the end-product by means of the strong adhesion of the spacer frame, insofar as the spacer frame material has dimensional stability and creep resistance that are sufficient in the long term.

Finally, electrical and/or electronic functional elements may be incorporated or integrated, in a manner known per se, into such an insulating glazing unit. These may be located just as well in the space between the panes as within a laminated pane used as rigid pane, if they cannot be installed on one of the external faces or if it is not desired to install them thereon. For example, functional elements such as electrochromic or electroluminescent screens, lamps, display screens, solar cells, sensors, indicators, heating elements and/or antennas may be envisioned here. Likewise, nonelectrical elements, such as for example thermochromic or photochromic surface elements, such as naturally transparent and/or opaque coatings, in particular thermal barriers and/or light filters and/or color filters, may be combined with insulating glazing units according to the invention.

Insulating glazing units of the type described here are suitable for a wide variety of uses, both in vehicles and in buildings. For example, these insulating glazing units may be used for vehicle windows, for example in buses—and here preferably in the region passing from the side windows to the roof. The curved pane is then placed on the outside and is matched to the external outline. The inner pane, whether flat or curved differently, may then be provided with additional functional elements, for example surface lamps, or with other additional equipment.

Further details and advantages of the subject of the invention will become apparent from the drawings of an exemplary embodiment and by its detailed description that follows.

In these drawings, which are schematic representations with no particular scale:

Figure 1:
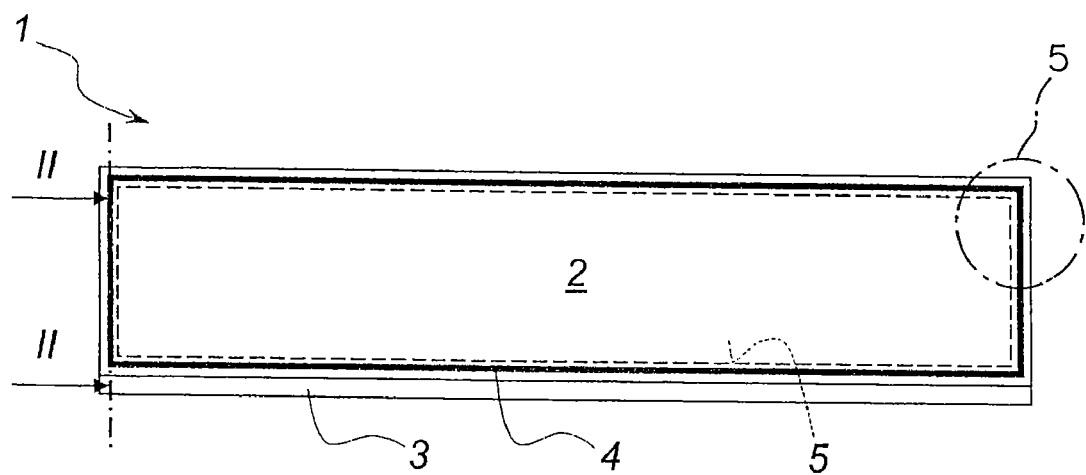
FIG. 1 is a view of an insulating glazing unit produced according to the invention.

FIG. 1 shows a plan view of an insulating glazing unit 1 comprising an upper curved rigid pane 2 and a subjacent flat rigid pane 3. In the embodiment discussed here, the flat pane extends beyond the outline of the curved pane 2 by a few centimeters so as to form a stepped insulating glazing unit.

Indicated beneath the upper pane 2 is the outline of a spacer frame 4, which extends on the periphery over the entire perimeter of the insulating glazing unit 1 and which defines, with the main internal faces of the two rigid panes 2 and 3, a space between the panes that is impermeable to air and moisture.

The reference 5 denotes the inner edge of a naturally opaque colored layer, which is deposited in the form of a frame on the inner face of one or both rigid panes 2/3 and which surrounds the actual, transparent, viewing field of the insulating glazing unit. This colored layer serves, on the one hand, in a manner known per se, for visually masking the elastomer spacer frame 4 and its joins where it is bonded to the two rigid panes, and, on the other hand, for protecting the elastomer material and the layers or beads of adhesive from UV radiation and from the embrittlement/loss of adhesion that results in the long term therefrom.

The opaque colored layer is not opaque in the representation, so as to make the spacer frame visible. It may moreover also extend beyond the protruding edge on one side of the pane 3.

The curvature of the pane 2 is not visible in FIG. 1 because it rises in the opposite direction to the viewing direction, and therefore out of the plane of the drawing.

Figure 2:
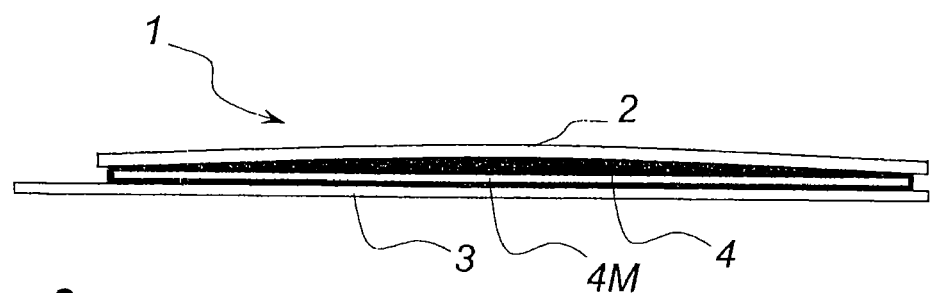
FIG. 2 is a sectional view of the same insulating glazing unit along the line of section II-II indicated in FIG. 1.

A view in cross-section on the line II-II of FIG. 1, shown in FIG. 2, illustrates the shape and the configuration of the spacer frame 4 in the curvature region. In the rest of the perimeter of the glazing unit, where the edges of the panes are mutually parallel (longitudinal edges), the spacer frame is simply straight and has a constant cross-section. As already mentioned, it may also be produced here with conventional metal section frame segments.

It should be emphasized that the arc height above the chord in the curvature region (here along the short lateral edges of the insulating glazing unit) may lie within the range of a few millimeters (between >0 and about 6 mm) depending on the length of the chord. To give an example, a radius of curvature of about 2000 mm may be mentioned for a chord of about 300 mm with a glass thickness of 4 mm. This results in a maximum arc height above the chord of about 5.5 mm.

In FIG. 2, it may also be seen that, on the one hand, the spacer frame 4 is reinforced by a metal insert 4M, which is not visible in FIG. 1. This insert 4M has a constant cross-section. The raw material for the spacer frame 4 is continuously manufactured in the form of an extruded (for example coextruded) section and cut to the desired length. In this case, it is not particularly difficult for the bonding points between section segments to be closed off sufficiently, because the material is plastically highly deformable and also possesses good adhesion to the usual filling, sealing and bonding materials.

Be that as it may, the corner zones, which in this representation lie on both sides of the visible segment of the spacer frame 4, may be produced without any difficulty by bending the material. As may be seen by comparison with FIG. 1, the straight spacer-bar segments on the longitudinal sides of the insulating glazing unit, in which the cross-section is invariant, are joined to these corner zones.

It may also be seen in FIG. 2 that the spacer frame 4 is slightly set back towards the interior, on the periphery, relative to the outer edges of the two panes 2 and 3. Placed in a manner known per se in the peripheral groove that remains, after completion of the bonding between the spacer frame and the rigid panes, is a polysulfide secondary sealant, not shown here, which preferably entirely fills said groove.

Finally, it may be seen that, in the embodiment illustrated here, the metal insert 4M is slightly off-center relative to the longitudinal extension of the spacer frame 4.

Figure 3:
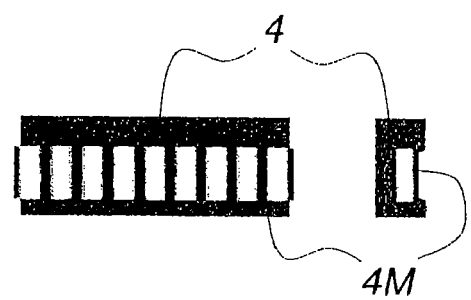
FIG. 3 shows two views of segments of the spacer frame for the insulating glazing unit according to FIGS. 1 and 2.

In FIG. 3, this is shown on a slightly larger scale by means of an elevational view and of a cross-sectional view flipped over to the right. This arrangement is admittedly not absolutely necessary for manufacturing an insulating glazing unit according to the invention, but it is also possible to work with conventional symmetrical sections provided that there is sufficient elastomer material that can be displaced at the side of the insert.

The basic embodiment of this spacer frame is known from document DE 30 02 904 A1 mentioned in the introduction. Another variant is provided here in that the metal insert 4M is open facing one side or, in other words, it is embedded in the elastomer material in an open channel on one side. In the mounted state, the opening of the channel is located to the outside, and therefore on the opposite side from the space between the panes, and it cannot be seen by the observer. On the side turned toward the space between the panes, the spacer frame presents a closed unitary image.

The compression of the spacer frame 4 from the initial state (shown for example in FIG. 3) and from the deformed state between the curved pane 2 and the flat pane 3, with a variable cross-section in the longitudinal direction (indicated in FIG. 3 by a broken curved line with substantial shortening in perspective of the possible arc), takes place in the direction of the transverse extension of the metal insert 4M, which is by nature flat, but slightly corrugated in order to facilitate the deformation (flexure). Consequently, its width must everywhere be less than the minimum distance between the two rigid panes 2/3 so that the metal does not come into contact with the faces of the panes.

The opening on one side of the channel formed in the elastomer material of the spacer frame for the metal insert 4M facilitates displacement of the elastomer material necessary for the variation in cross-section. This flows in the compressed state on the one hand toward the side (the spacer frame must therefore be slightly thicker there), it may however also be displaced in the initially open channel and partly or entirely fill the latter. If required, either the elastomer material of the spacer frame is deformed while it is still in the hot state after hot deposition, or the material is heated for this deformation operation, if it is not sufficiently plastically deformable at the usual operational temperatures (ambient temperature).

Figure 4:
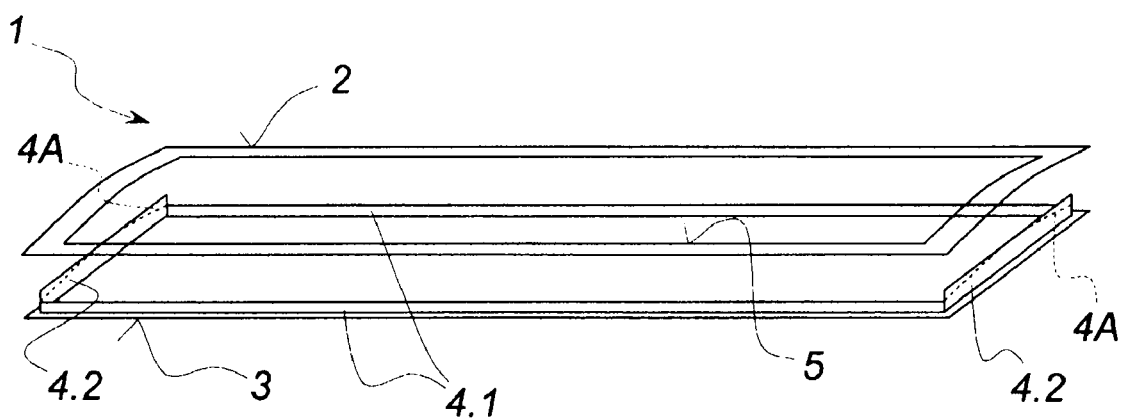
FIG. 4 is an exploded representation of an insulating glazing unit according to the invention before the curved rigid pane is placed on the prepared spacer frame.
Figure 5:
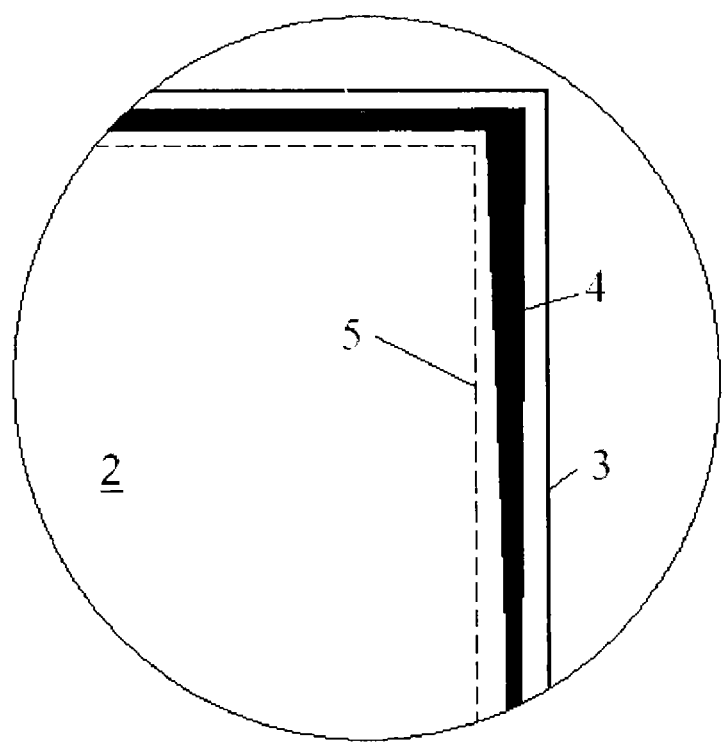
FIG. 5 is a detail of the glazing unit shown in FIG. 1, showing in detail the circled region of FIG. 1, including an overthickness.

FIG. 4 is an exploded representation showing, by way of an example, in the form of an empty drawing, the various parts needed for making up an insulating glazing unit 1 according to the invention before the curved pane 2 is put into position. The latter already has its curved base shape before it is put into position. It is also provided with a colored surround layer, which in reality is opaque but indicated only by its inner edge 5, as in FIG. 1. Placed on the flat pane 3, along its outer edges and slightly set back toward the inside, are four segments of a spacer section, each comprising two segments 4.1 and 4.2. It may be clearly seen that the segments 4.2, which will be adapted to the curved edges of the pane 2, are higher than the segments 4.1 along the straight longitudinal edges of the insulating glazing unit 1. Drawn in the segments 4.2 is a broken line 4A, which reproduces the arc of the edges of the curved pane, and thus also the outline that these segments 4.2 have after the curved pane has been put in position and pressed.

The state of deformation of the curved pane 2, illustrated in FIG. 2 and indicated in FIG. 4, may be achieved in various ways. As a general rule, a precurved pane 2 of cylindrical shape is put in position on the spacer frame already placed on the flat pane 3 and the (longitudinal) edges are pressed, possibly in several steps, toward the flat pane 3 until the highest region of the arc of the curvature of the pane 2 is also securely joined to the spacer frame 4 by bonding. Again in this crown region, at least a slight deformation will therefore be caused by safety, by compressing the elastomer material. A precurved pane 2 is not necessarily still further deformed during this operation, except possibly in the elastic deformation region, a surface support for the entire arc being possible here, if required, in order to avoid breakage.

However, it is also possible for the curved pane 2 to be deformed cold, in its elastic deformability range, by a similar pressing operation starting from an initially flat shape, when the material of the pane is not too thick. With such an initial shape, if only the (longitudinal) edges are loaded, a curvature of the pane due to the reaction of the spacer frame 4 to be deformed will necessarily be established. In addition, a defined amount of the arc height may be achieved by a central support in the curvature region (which is effective between the inner faces of the two rigid panes in the region of the peripheral outer groove) or also by a curvature template temporarily placed between the two rigid panes parallel to the spacer frame to be deformed.

Of course, other combinations of the two methods may also be envisioned. For example, an initially slightly precurved pane may be brought elastically to its final curved shape during the pressing operation. This has the advantage that the restoring forces acting on the bonded spacer frame are not as high as in the case of a pane going from the flat state while cold.

After the final curing, bonding, etc. of the assemblies bonded together between the spacer frame and the rigid panes, and after the elastomer material itself has solidified, the elastically curved pane will retain the desired shape without other measures having to be taken. Such a procedure is known per se also in the case of curved laminated panes.

The invention claimed is:
1. An insulating glazing unit comprising:
at least one curved rigid pane;
another rigid pane to be mutually pressed together with the at least one curved rigid pane;

a spacer frame for joining the curved rigid pane and the other rigid pane together by an impermeable adhesive, creating a space between the panes when the curved pane and the other rigid pane are mutually pressed together, which spacer frame has a variable height over its length, looking toward the curvature of the pane, in a curvature region of the curved rigid pane, such that the space between the panes has a portion with a smaller height and portion with a larger height in the curvature region, wherein the spacer frame includes plural segments, wherein the segments of the spacer frame corresponding to the curvature region have a uniform height in the entirety of said curvature region that is larger than the height of the segments of the spacer frame not located in the curvature region, wherein, upon pressing together the at least one curved rigid pane and the another rigid pane, the spacer frame comprises, in said curvature region, an elastomer material which is plastically deformed to provide at least one local overthickness as viewed in the direction of the height of the space between the panes.

2. The insulating glazing unit as claimed in claim 1, wherein a metal insert of constant width is embedded in the spacer frame.

3. The insulating glazing unit as claimed in claim 1, wherein the spacer frame is manufactured from a continuous extruded section with an initially constant height and including only a single welding point.

4. The insulating glazing unit as claimed in claim 1, comprising a curved pane and a flat pane, or two curved panes having different curvatures, in which unit the elastomer spacer frame compensates in the latter case for differences in curvature by a plastic deformation.

5. The insulating glazing unit as claimed in claim 1, wherein the variable height of the spacer frame is produced in the curvature region by pressing and displacement of the elastomer material.

6. The insulating glazing unit as claimed in claim 1, wherein the rigid panes are made of glass or plastic.

7. The insulating glazing unit as claimed in claim 6, wherein a rigid glass pane includes prestressed or partially prestressed or unprestressed glass.

8. The insulating glazing unit as claimed in claim 1, wherein at least one rigid pane is a laminated pane made up of two glass and/or plastic rigid panes joined together by surface adhesion.

9. The insulating glazing unit as claimed in claim 1, including a transparent viewing field.

10. The insulating glazing unit as claimed in claim 9, further comprising an electrical functional element of a surface lamp, or a solar cell, or a display screen.

11. The insulating glazing unit as claimed in claim 10, wherein the electrical functional element lies within the space between the panes.

12. The insulating glazing unit as claimed in claim 10, wherein the electrical functional element is housed between the rigid panes of the insulating glazing unit.

13. The insulating glazing unit as claimed in claim 1, wherein a secondary sealant surrounds the entire spacer frame on the outside.

* * * * *